United States Patent [19]

Kutaragi

[11] Patent Number: 5,148,292

[45] Date of Patent: Sep. 15, 1992

[54] APPARATUS FOR EFFECTIVELY COMPRESSING VIDEO DATA REPRESENTING A RELATIVELY SIMPLE IMAGE HAVING STRONG AREA CORRELATION

[75] Inventor: Ken Kutaragi, Kanagawa, Japan

[73] Assignee: Sony Corporation, Tokyo, Japan

[21] Appl. No.: 646,225

[22] Filed: Jan. 28, 1991

[30] Foreign Application Priority Data

Jan. 31, 1990 [JP] Japan ................... 2-21115

[51] Int. Cl.⁵ .............................................. H04N 1/40
[52] U.S. Cl. ..................... 358/433; 358/432
[58] Field of Search ... 358/432, 433, 426, 261.1–261.3

[56] References Cited

U.S. PATENT DOCUMENTS

| | | | |
|---|---|---|---|
| 4,134,133 | 1/1979 | Teramura et al. | 358/432 |
| 4,155,097 | 5/1979 | Lux | 358/433 |
| 4,951,157 | 8/1990 | Koh et al. | 358/433 |
| 5,034,968 | 7/1991 | Willey et al. | 358/433 |

Primary Examiner—Stephen Brinich
Attorney, Agent, or Firm—Alvin Sinderbrand; William S. Frommer

[57] ABSTRACT

A video data processing apparatus for performing video data compression in which one picture image is divided into a predetermined number of blocks of pixels and video data in each block of pixels are compressed by predetermined processing to thereby reduce the amount of video data representing the image that need be stored in a memory. The processing proceeds by determining if plural blocks consist of the same pixel data and if so, the pixel data for only one block is stored. The pixel data for the other blocks which are not stored but which consist of the same pixel data are obtained by reading out the pixel data of the block which is stored, whereby the amount of data to be stored in a memory is substantially reduced.

11 Claims, 6 Drawing Sheets

APPARATUS FOR EFFECTIVELY COMPRESSING VIDEO DATA REPRESENTING A RELATIVELY SIMPLE IMAGE HAVING STRONG AREA CORRELATION

BACKGROUND OF THE INVENTION

1. Field of the Invention

The present invention relates to a video data processing apparatus, and more particularly, to such apparatus adapted to perform video data compression.

2. Description of the Prior Art

Conventionally, for storing a variety of video data such as a video signal representative of an image and so on in a memory, a video signal formed, for example, by scanning one picture image in line sequence is converted directly to a digital signal which is then stored.

However, the amount of data to be stored should be as small as possible. Consequently, it is necessary to compress the amount of video data derived form the scanned image and store the compressed video data in a memory. There have been proposed a variety of compressing methods which nevertheless need a relatively large scaled circuit arrangement for the data compression. Another drawback associated with these conventional methods is that they provide a relatively small compression ratio for attending to video data in many different conditions. Therefore, such conventional methods are not appropriate to compress, for example, data of images having a relatively strong area correlation (images which exhibit relatively few changes in one image) which may be inputted by hand writing.

OBJECTS AND SUMMARY OF THE INVENTION

Accordingly, it is an object of the present invention to provide an improved video data processing apparatus in which the aforenoted shortcomings and disadvantages encountered with the prior art can be eliminated.

More specifically, it is an object of the present invention to provide a video data processing apparatus for compressing video data which admits of a simple structure while providing a large compression ratio.

According to an aspect of the present invention, a video data processing apparatus is comprised of a circuit for dividing one picture image into a predetermined number of picture blocks, a circuit for scanning each picture block from the same predetermined point in each block, a circuit for converting a number of picture elements in a picture block having the same video content continuously in the scanning direction into data, a circuit for reversing the scanning direction in each of the divided picture blocks at every line, and a circuit for continuously carrying out the scanning with the divided picture blocks.

The above and other objects, features, and advantages of the present invention will become apparent from the following detailed description of an illustrative embodiment thereof to be read in conjunction with the accompanying drawings, in which like reference numerals represent the same or similar parts.

DETAILED DESCRIPTION OF THE PREFERRED EMBODIMENT

An embodiment of a video data processing apparatus according to the present invention will hereinafter be explained with reference to the accompanying drawings.

Figure 1:
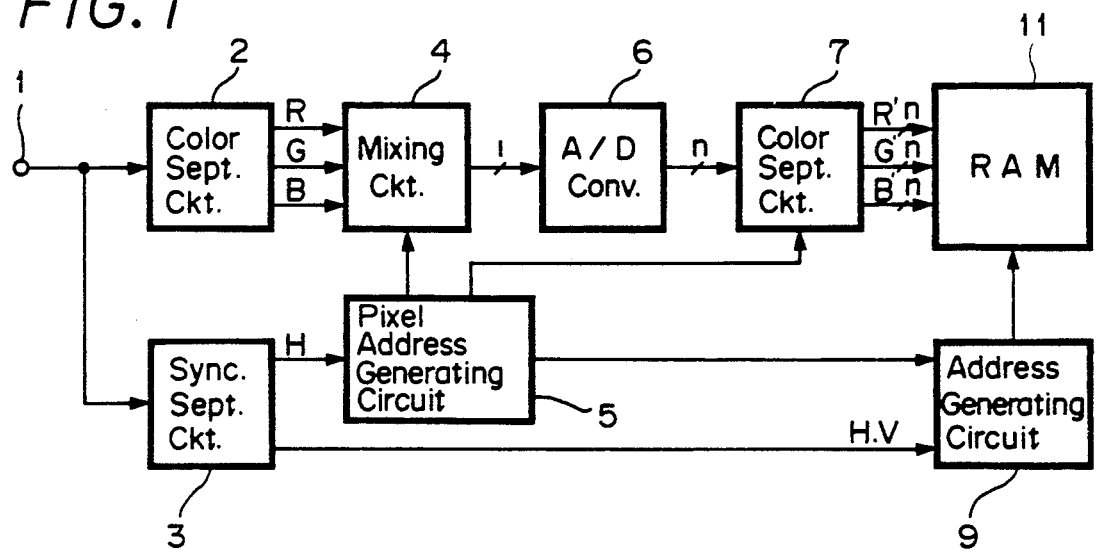
FIG. 1 is a block diagram showing a configuration of a video data input unit that may be used with the present invention.

In the present embodiment, a video signal representing a still image is data compressed. In FIG. 1, a video signal input terminal 1 is supplied with a video signal representing a still image which is to be stored in a memory. As one example, the video signal supplied to the terminal 1 may be a signal generated from a graphic apparatus which operates to receive a hand-drawn arbitrary image produced, for example, by means of a drawing tablet or the like.

The video signal applied to the input terminal 1 is supplied to a color separating circuit 2 to be separated into red, green and blue color signals, R, G, B, and also is supplied to a synchronizing signal separating circuit 3. The color signals R, G, B are supplied to a mixing circuit 4 in which they are converted into serial data which in turn is supplied to an analog-to-digital (A/D) converter 6 for converting the serial data into digital data of a predetermined number of bits (n bits). This digital data is supplied to a color separating circuit 7, and digital color signals R', G', B' are supplied as digital video data to a first RAM (random access memory) 11.

The synchronizing signal separating circuit 3 extracts a horizontal synchronizing signal H and a vertical synchronizing signal V from the video signal applied to the input terminal 1, and supplies the extracted horizontal synchronizing signal H to a pixel address generating circuit 5. The pixel address generating circuit 5, synchronized to the horizontal synchronizing signal H, generates pixel address data which is supplied to the mixing circuit 4, the color separating circuit 7 and an address generating circuit 9. The mixing circuit 4 and the color separating circuit 7 perform their respective signal processing operations as a function of this pixel address data. The horizontal synchronizing signal H and the vertical synchronizing signal V extracted by the synchronizing signal separating circuit 3 are also supplied to the address generating circuit 9 which generates address data to be supplied to the first RAM 11 as a function of these horizontal and vertical synchronizing signals H, V and the pixel address data. In this embodiment, the first RAM 11 is assumed to have a sufficient capacity or addresses for storing the pixels which constitute an image.

Figure 2:
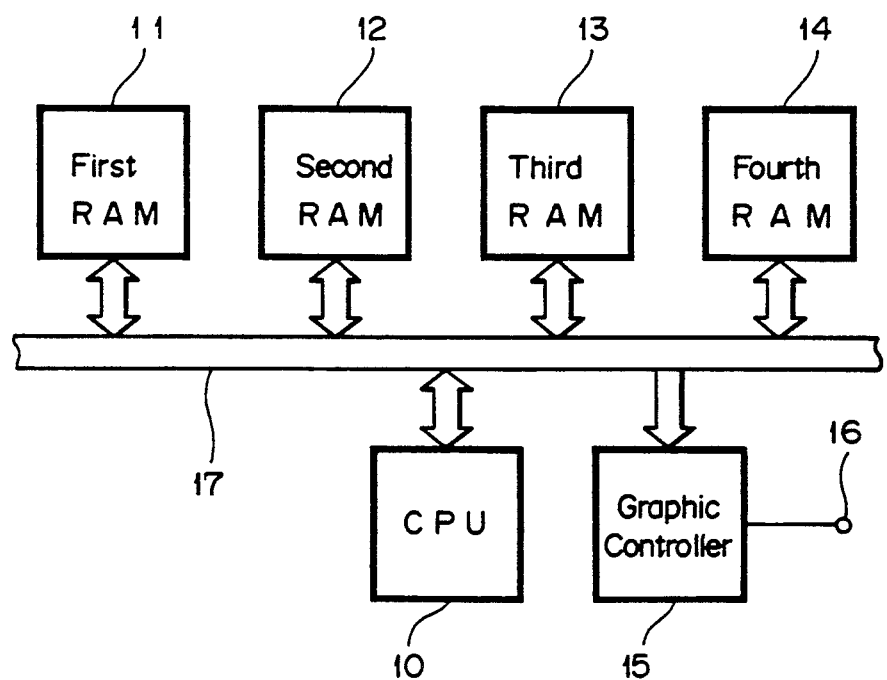
FIG. 2 is a block diagram showing a memory configuration for performing data compression in accordance with this invention.

The first RAM 11 is connected to second, third and fourth RAMs 12, 13, 14 through a bus 17 as shown in FIG. 2, wherein data transfer is performed among these RAMs under the control of a central control unit, shown as a central processing unit (CPU) 10. The bus 17 is connected to a graphic controller 15, which converts video data stored in the respective RAMs to video signals to be supplied as output signals from an output terminal 16.

Figure 3:
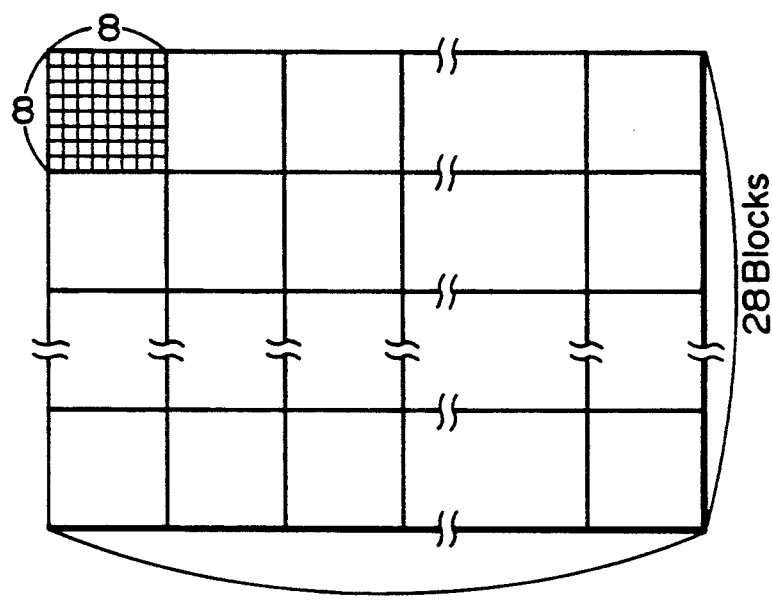
FIGS. 3 and 4 are explanatory diagrams respectively showing a picture image divided into blocks in accordance with a preferred embodiment.
Figure 4:
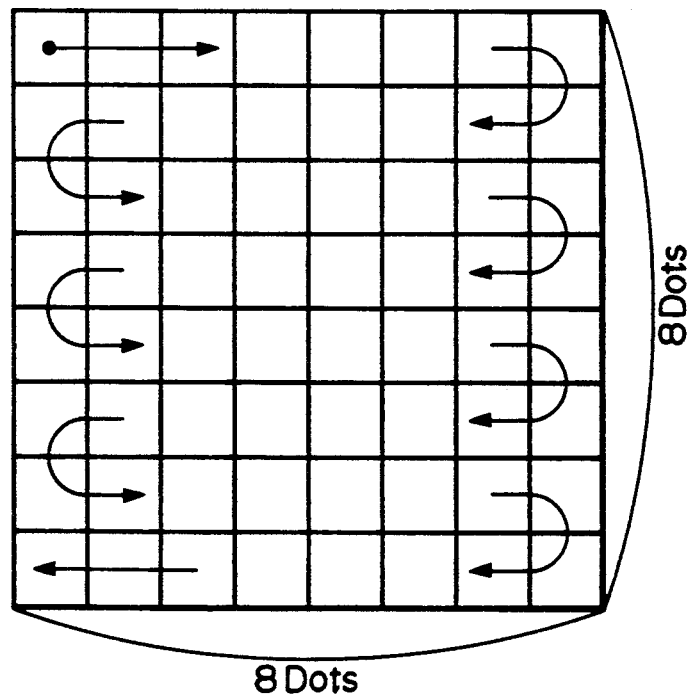

In the present embodiment, data compression is performed by transferring the video data stored in the first RAM 11 sequentially to the second, third and fourth RAMs 12, 13, 14 under the control of the central control unit 10. More specifically explaining this data compression processing, video data representing one picture image of a still image is first divided into an array of blocks, formed of 28 (vertical direction)×32 (horizontal direction), that is, a total of 896 blocks, as shown in FIG. 3, and video data representing the contents of the respective blocks are generated. In this example, each of the thus divided blocks is formed of a pixel array of 64 dots, i.e., 8 dots (the vertical direction)×8 dots (the horizontal direction) as shown in FIG. 4. The first RAM 11 stores all pixels included in one picture image, the second RAM 12 stores the video data representing the pixels of a block, the third RAM 13 stores the positional data of each block in the 28×32 array of blocks, and the fourth RAM 14 stores compressed video data for each block.

Figure 5:
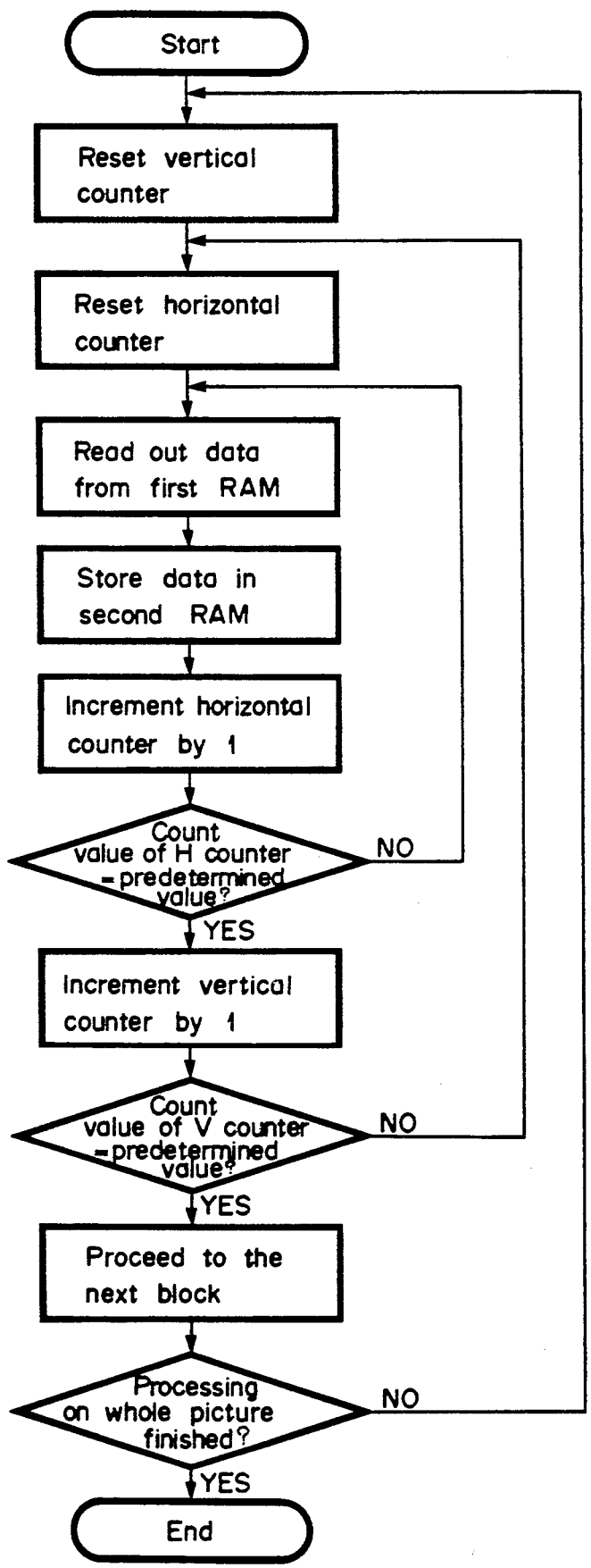
FIG. 5 is a flowchart showing the procedure by which video data representing the contents of each block are generated.

Next, the generation of video data representing the contents of each block will be explained with reference to the flowchart shown in FIG. 5. As shown in the flowchart of FIG. 5, at first, a vertical counter and a horizontal counter (both not shown) for reading data out of the first RAM 11 are reset, and video data stored in the first RAM 11 is read out dot by dot and stored in the second RAM 12 under the control of the central control unit 10. The horizontal counter counts up as each dot is read until it counts up to a value 8 which is equal to the number of dots included in one line in a block. At the time the horizontal counter reaches the count of 8, the vertical counter is incremented by one count and the horizontal counter is reset to count the dots included in the next line of this block. When the vertical counter reaches the count of 8 which is the number of lines in one block, it is determined that all dots included in one block have been read out of the first RAM 11 and stored in the second RAM 12, and the aforedescribed processing proceeds to the next adjacent block. In the next block, data representing each dot is stored in the second RAM 12 in the same manner. Thus, video pixel data included in the respective blocks are sequentially stored in the second RAM 12 block-by-block.

Figure 6:
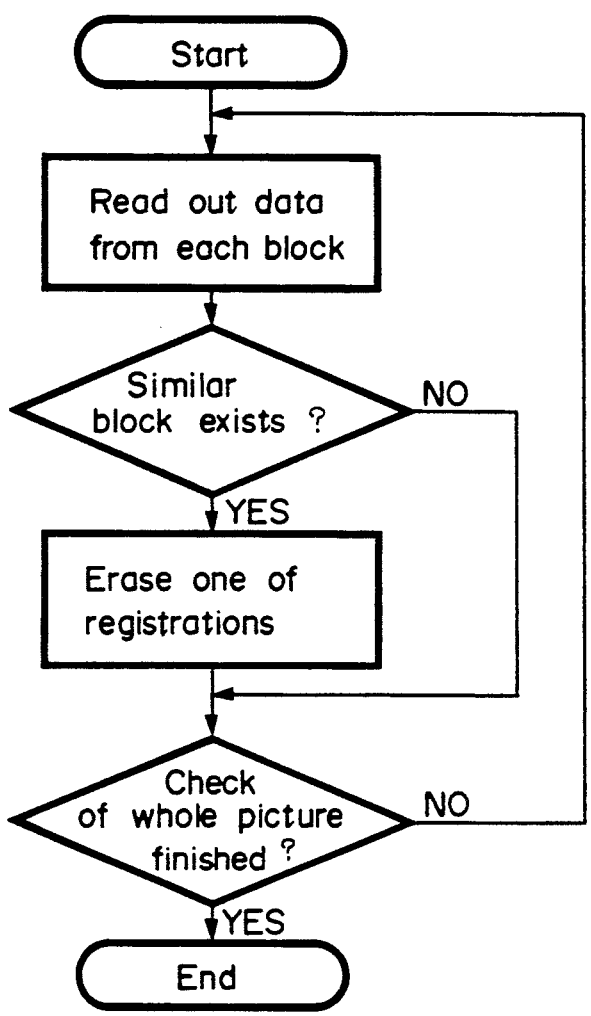
FIG. 6 is a flowchart showing the procedure of same data checking.

Once video data of the respective blocks have been stored in the second RAM 12 as aforedescribed, a determination is made as to whether the video data of one block is the same as the video data of another block. More specifically, a determination is made as to whether the dots of one block are the same as the dots of another. As shown in the flowchart of FIG. 6, under the control of the central control unit 10, video data in the respective blocks are read out of the second RAM 12 and it is determined whether or not there is more than one block having the same video data. If blocks having the same video data are found, the video data in one of the blocks is erased. This determination of whether or not there are blocks having the same video data content is made with respect to all the blocks in one picture image.

Figure 7:
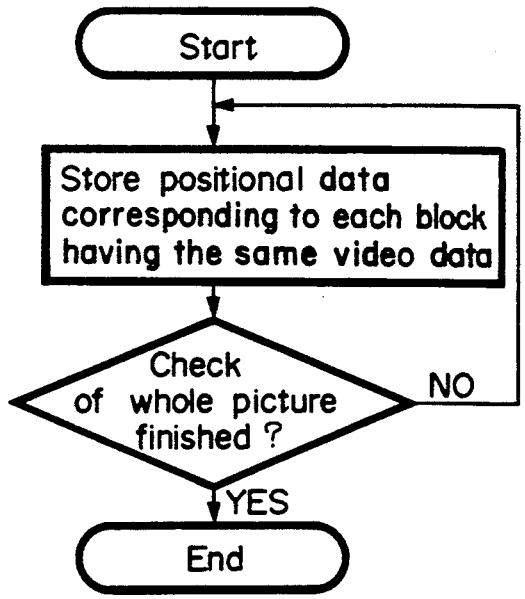
FIG. 7 is a flowchart showing the procedure of data mapping processing.

Next, as shown in the flowchart of FIG. 7, block position data is associated with the video data of each of the blocks stored in the second RAM 12, and the block position data for each block is stored in the third RAM 13 under the control of the central control unit 10. If the video data of a block has been erased, as described in the foregoing processing carried out by the flowchart of FIG. 6, the video data of a particular block which remains is provided with block position data representing the positions of all blocks which had the very same video data, particularly those which were erased. Hence, the block position data for all blocks are stored in the third RAM 13.

Figure 8:
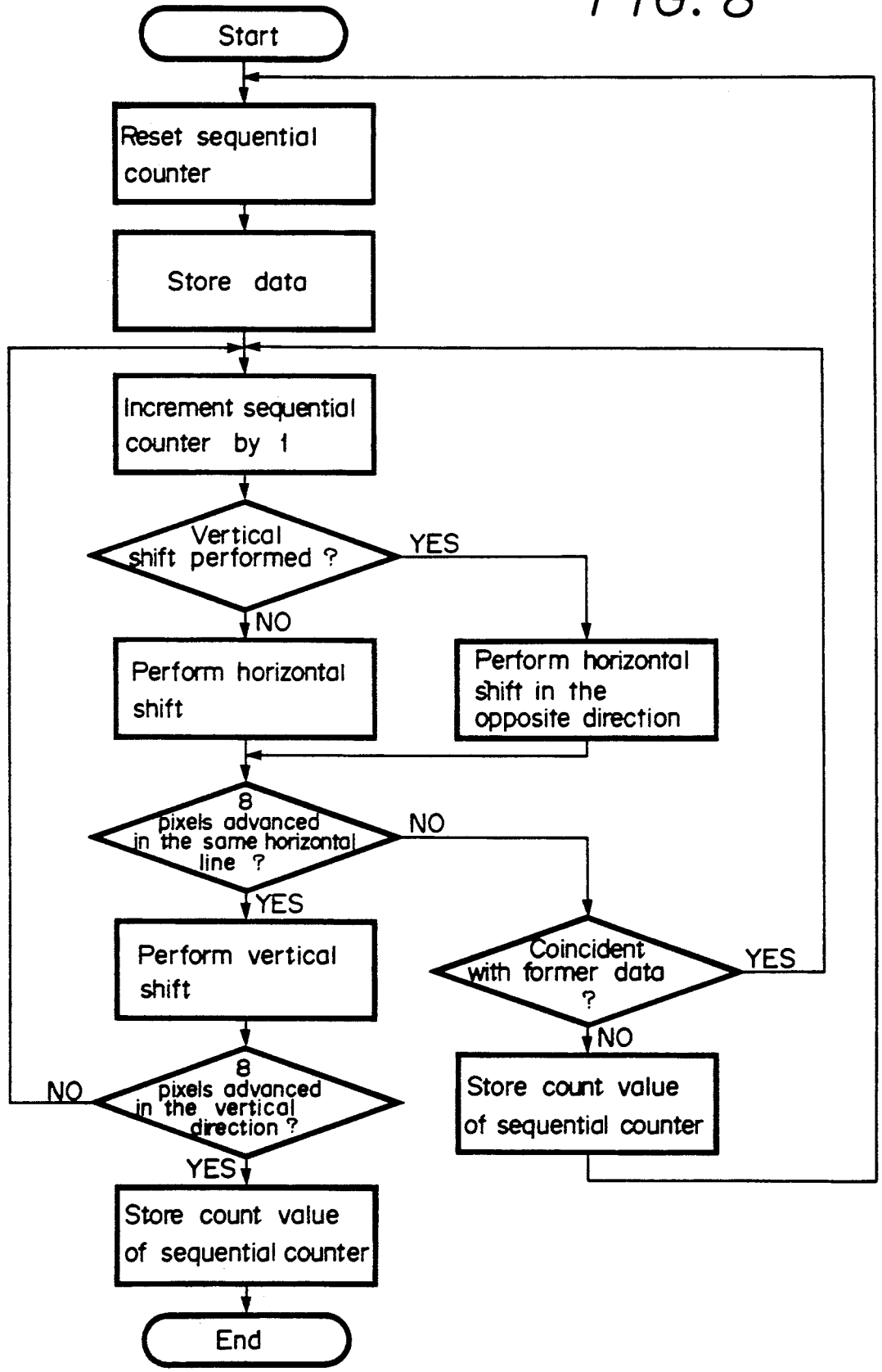
FIG. 8 is a flowchart showing the procedure of data compression processing.

Next, as shown in the flowchart of FIG. 8, the video data of the respective blocks which remain stored in the second RAM 12 are stored in the fourth RAM 14, under the control of the central control unit 10 to thereby perform video data compression. More specifically, the central control unit 10 is equipped with a sequential counter (not shown) which is reset before the video data of a block are read out of the second RAM 12 and stored in the fourth RAM 14. The counter then counts the number of sequential dots in a block which exhibit the same video data as the block is read out of the second RAM 12. The sequential counter counts up each time one dot in a row of a block is read out, whereby the read out dot position is shifted one by one in the horizontal direction. In the preferred embodiment, it should be noted that immediately after a vertical shift from one row of dots to another is performed, the horizontal shifting direction is reversed.

Each time the horizontal shift is advanced by 8 dots (8 pixels), a vertical shift is performed for one dot (i.e. one row). The read-out position shift is continued until the vertical shifting has been shifted by 8 dots, or rows. By thus shifting the read-out position, all the dots in one block are sequentially scanned from the upper left end, for example, as indicated by arrows in FIG. 4.

In the course of performing the above-mentioned vertical and horizontal shifts, it is determined whether or not the video data in one dot position (i.e. before shifting) is coincident with the video data in the adjacent dot position (i.e. after the shifting). If they are coincident, it is concluded that the same video data is continuously read out from one dot to the next, and therefore the sequential counter is counted up. On the other hand, if the video data in one dot position is not coincident with the video data in the preceding dot position, the count value reached by the sequential counter at the preceding dot position is stored in the fourth RAM 14 and then the counter is reset.

By the above operation, the number of successive dots which are scanned along the scanning direction in each block and which have the same video data is counted by the sequential counter, and the counted value is stored in the fourth RAM 14. This count data stored in the fourth RAM 14 may be represented as shown in, for example, FIG. 9, wherein the first bit is indicative of the scanning direction, the next 8 bits are indicative of the video data at the coordinate position of a starting point or dot position of the successive dots having the same video data and the next 6 bits are indicative of the number of such successive sequential dots. When the video data changes from one dot to the next, the 8-bit coordinate position and the 6-bit sequential number representing the number of successive dots having this new video data are indicated, and this count value data continues for one block.

While the above data are sufficient for a monochrome image, it will be necessary to add several bits of color data to the coordinate position data of the starting point when representing a color image.

By the foregoing data processing, video data in the respective blocks are compressed and stored in the fourth RAM 14. It should be noted that the amount of data representative of a respective block varies depending upon the image in that block. If one block is filled with a single color of constant magnitude, the amount of data needed to represent the image in that block will be a minimum. Also, if plural blocks presenting the same pattern (i.e. having the same video data) exist, the number of blocks is decreased because duplicate blocks are erased, resulting in a further reduction in the amount of data needed to represent a picture image.

Figure 9:
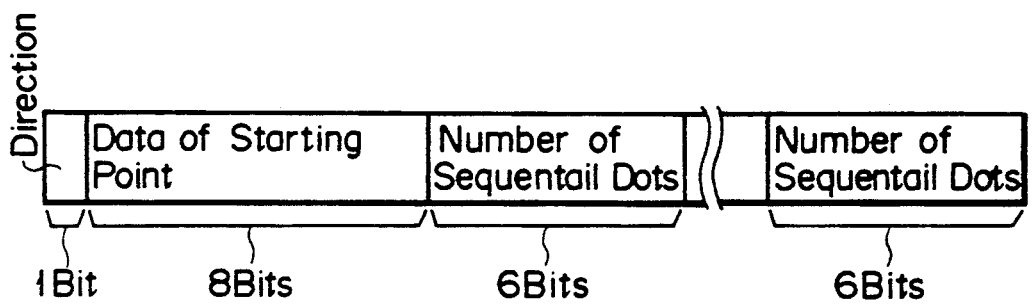
FIG. 9 is a schematic diagram showing an example of the data format used in the preferred embodiment of this invention.
Figure 10:
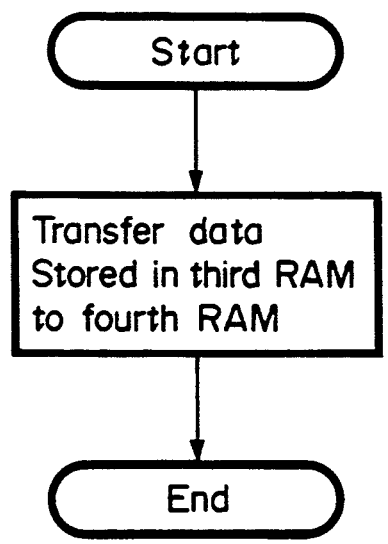
FIG. 10 is a flowchart showing the procedure of data storage processing.

The one bit shown in FIG. 9 indicative of the scanning direction may represent, for example, a sequential line scan in the horizontal direction as described above or a sequential line scan in the vertical direction. If the amount of compressible data differs depending on the scanning directions, the scanning direction which results in greater data compression is selected under the control of the central control unit 10 and the scanning direction bit is stored in the fourth RAM 14.

The data of the respective blocks stored in the fourth RAM 14 are maintained as compressed video data representative of one still image.

Next, an explanation is provided as to how the above-mentioned compressed data is read out of the fourth RAM 14.

The compressed video data of the respective blocks stored in the fourth RAM 14 are read out to the second RAM 12 under the control of the central control unit 10 (FIG. 2). Here, the original dot data is restored in a manner opposite to the aforedescribed data compression processing. It is determined on the basis of the data read out of the third RAM 13 where the block formed of the restored video data for each dot of that block was positioned in the original array of blocks, and based on this determination, the restored blocks of video data for each dot of each of the blocks are assigned to addresses in the first RAM 11 corresponding to their block positions on the original picture, whereby pixel data at all of the dot positions of an image of one picture are stored in the first RAM 11.

Then, one picture comprised of the video data stored in the first RAM 11 is supplied to the graphic controller 15 connected to the first RAM 11 through the bus 17 under the control of the central control unit 10. The graphic controller 15 converts the video data to a video signal in a predetermined format (such as analog, NTSC) which is supplied to the output terminal 16. A still image represented by the video data is displayed, for example, on a television receiver (not shown) connected to the output terminal 16.

The above described video data processing of the present embodiment permits favorable data compression for a relatively simple image having strong area correlation such as a video signal representative of a hand-written still image inputted by a tablet or the like. More specifically, the present embodiment provides, for example, approximately 1/10 compression of original video data. It is therefore possible to provide a substantial reduction in the amount of data to be stored in a memory and is particularly advantageous for storing a minimum amount of video data representing still images.

In the above described embodiment, the scanning of a respective block for compression is performed in the vertical direction or in the horizontal direction, however, such scanning may be performed in any other direction, for example, in an oblique direction. It should be noted, however, that scanning is preferably performed in the direction resulting in the largest data compression. Thus, the scanning direction may be selected in accordance with the particular image information of the inputted video data.

According to the present invention as described above, video data representing a relatively simple image having strong area correlation is effectively compressed, with the result that a substantially reduced amount of data representing that image may be stored in a memory.

Having described the preferred embodiment of the invention with reference to the accompanying drawings, it is to be understood that the invention is not limited to that precise embodiment and that various changes and modifications thereof could be effected by one skilled in the art without departing form the spirit or scope of the novel concepts of the invention as defined in the appended claims.

I claim as my invention:

1. A video data processing apparatus comprising:
    a) means for dividing a picture image into a predetermined number of picture blocks, each picture block being comprised of lines of picture elements;
    b) scanning means for scanning in a particular scanning direction the picture elements of each picture block from a predetermined point in the scanned block;
    c) determining means for determining the number of successive picture elements having the same content during a scan in the scanning direction;
    d) means for reversing the scanning direction in a picture block at every line; and
    e) means responsive to said scanning and determining means for generating data indicative of video data of a picture element and the number of succeeding picture elements in a picture block having the same video data.

2. A video data processing apparatus comprising:
    means for dividing a picture image into a predetermined number of picture blocks, each containing video data;
    means for determining the video data of each picture block;
    means for sensing whether or not there is the same video data in plural picture blocks;
    storage means for storing one of said plural picture blocks having said same video data and for storing positional data representing the respective positions in said picture image of those picture blocks having said same video data; and
    means for recovering the video data of picture blocks which are not stored by reading out the video data of the respectively stored picture blocks and said positional data.

3. The apparatus of claim 1 wherein said scanning means comprises line scan means for scanning successive picture elements in a line.

4. The apparatus of claim 3 wherein said determining means comprises means for determining if the content of a picture element being scanned is coincident with the content of the preceding adjacent picture element.

5. The apparatus of claim 4 wherein said determining means further comprises counter means incremented when a next successive picture element is scanned, storage means for storing the count reached by said counter means if the content of the picture being scanned is not coincident with the content of the preceding adjacent picture element, and reset means operative when said count reached by said counter means is stored in said storage means for resetting said counter means before the next successive picture element is scanned.

6. The apparatus of claim 5 wherein said line scan means includes line shift means for shifting the scanning of picture elements to a next adjacent line in a picture block after the last picture element in the line presently being scanned is scanned.

7. The apparatus of claim 2 wherein said storage means comprises memory means for storing all of said picture blocks, means for providing positional data representing the respective position of each picture block in said picture image, and means for erasing from said memory means all but one of those picture blocks having said same video data.

8. The apparatus of claim 7 wherein said memory means comprises a first memory for storing all of said picture blocks, a second memory for storing picture blocks and positional data, means for reading out from said first memory to said second memory a picture block having video data that has not been read previously, and means for providing a respective picture block stored in said second memory with the positional data of all of the picture blocks stored in said first memory which have the same video data as that picture block.

9. The apparatus of claim 8 further comprising data compression means coupled to said second memory for compressing data representing a stored picture block.

10. The apparatus of claim 9 wherein each stored picture block is comprised of lines of picture elements and said data compression means comprises scanning means for scanning in a particular scanning direction the picture elements of a picture block; determining means for determining the number of successively scanned picture elements having the same content; and means responsive to said scanning and determining means for generating data indicative of the content of a picture element and the number of successively scanned picture elements having that content.

11. The apparatus of claim 10 wherein said determining means comprises counter means incremented when a next successive picture element is scanned, storage means for storing the count reached by said counter means if the content of the picture element being scanned is not coincident with the content of the preceding adjacent picture element, and reset means operative when said count reached by said counter means is stored in said storage means for resetting said counter means before the next successive picture element is scanned.

* * * * *